US007006255B2

(12) United States Patent
Sun et al.

(10) Patent No.: US 7,006,255 B2
(45) Date of Patent: Feb. 28, 2006

(54) ADAPTIVE IMAGE FILTERING BASED ON A DISTANCE TRANSFORM

(75) Inventors: Shijun Sun, Vancouver, WA (US); Shawmin Lei, Camas, WA (US)

(73) Assignee: Sharp Laboratories of America, Camas, WA (US)

( * ) Notice: Subject to any disclaimer, the term of this patent is extended or adjusted under 35 U.S.C. 154(b) by 974 days.

(21) Appl. No.: 09/823,027

(22) Filed: Mar. 29, 2001

(65) Prior Publication Data

US 2002/0159096 A1 Oct. 31, 2002

(51) Int. Cl.
*G06K 15/00* (2006.01)
*G06T 5/00* (2006.01)
*H04N 1/407* (2006.01)
*H04N 1/409* (2006.01)

(52) U.S. Cl. .................. 358/3.27; 358/1.9; 358/3.26

(58) Field of Classification Search .............. 358/1.9, 358/3.15, 3.26, 3.27; 382/232, 235, 250, 382/254
See application file for complete search history.

(56) References Cited

U.S. PATENT DOCUMENTS

| 5,239,591 | A | * | 8/1993 | Ranganath ................ 382/128 |
| 5,473,384 | A | | 12/1995 | Jayant et al. .............. 348/470 |
| 5,512,956 | A | | 4/1996 | Yan ........................... 348/606 |
| 5,694,491 | A | * | 12/1997 | Brill et al. ................. 382/260 |
| 5,799,112 | A | * | 8/1998 | de Queiroz et al. ....... 382/254 |
| 5,819,035 | A | | 10/1998 | Devaney et al. ........... 709/202 |
| 5,850,294 | A | * | 12/1998 | Apostolopoulos et al. .................... 358/426.14 |
| 5,920,356 | A | | 7/1999 | Gupta et al. ............... 348/606 |
| 6,449,389 | B1 | * | 9/2002 | Schweid .................... 382/164 |
| 6,574,353 | B1 | * | 6/2003 | Schoepflin et al. ........ 382/103 |
| 2004/0042662 | A1 | * | 3/2004 | Wilensky et al. .......... 382/194 |

\* cited by examiner

*Primary Examiner*—Thomas D. Lee
*Assistant Examiner*—James A. Thompson
(74) *Attorney, Agent, or Firm*—Marger Johnson & McCollom

(57) ABSTRACT

A method for reducing visual artifacts in reconstructed images. One embodiment of the method determines edge energy for each pixel in the image and then compares the edge energy for each pixel to a threshold, producing an edge map. A distance transform is then used to produce a filter map and a filter is applied to pixel in the image, such that the filter applied is dependent upon a filter map value for each pixel. An output value for each pixel is then produced.

21 Claims, 2 Drawing Sheets

ADAPTIVE IMAGE FILTERING BASED ON A DISTANCE TRANSFORM

BACKGROUND

1. Field

This disclosure relates to compression of electronic image signals, more particularly to removal of distortions in reconstructing of these compressed image signals.

2. Background

Block-based DCT (Discrete Cosine Transform) coding has been used in many image compression standards, such as H.261, H.263, JPEG, MPEG-1, and MPEG-2. This is a lossy compression technique, meaning that there are variations in the output image when compared to the original image. The compression process causes visual artifacts in the decoded images, two of which are referred to as blocking and ringing. Blocking artifacts occur along the block boundaries and ringing artifacts appear near strong image edges, both due to the coarse quantization of the DCT coefficients.

Among the coding artifacts, ringing is the most visible one in high quality systems, those having low compression ratios. One typical example of the ringing artifacts is the noise surrounding strong image edges that represent text and graphical object boundaries. In video coding, due to slight variations from frame to frame, ringing noise is visible in moving pictures as a local flickering near edges. This type of noise is known as "mosquito noise."

In general, for a given compression ratio, there is a limitation on the visual quality of an image. Quantization tables can be carefully designed to get higher quality images, however, the tradeoff is to get lower compression ratio. Therefore, post-processing techniques have been introduced to remove the image artifacts from the reconstructed images. A postprocessor can process a reconstructed image signal to reduce or remove the image artifacts resulting from quantization distortions. The general rule of thumb is that image edges should be preserved while rest of the image should be smoothed with spatial filters carefully chosen based on the characteristic of a particular pixel or set of surrounding pixels.

Most of the current post processing techniques have focused on reducing the artifacts produced by DCT coding, in particular, reducing the blocking artifacts. These techniques operate along block boundaries, and have difficulty in removing the ringing artifact that extends over a larger area. Some examples of these types of techniques can be found in U.S. Pat. No. 5,850,294, issued Dec. 15, 1998; U.S. Pat. No. 5,512,956, issued Apr. 30, 1996; and U.S. Pat. No. 5,473,384, issued Dec. 5, 1995.

The '294 patent, for example, uses one-dimensional lowpass filters along the block boundaries to reduce visual artifacts, including blocking and ringing, in DCT coded images. The '956 patent performs three-dimensional post processing to reduce artifacts produced by block-based motion-compensated coding. Spatial and temporal filtering is applied and then a one-dimensional median filter is used in the spatial domain. The '384 patent provides a description of a post-filtering method with a temporal filter and a spatial filter. A multilevel median filter is applied in the spatial domain.

The techniques of the '384 patent can also remove certain amount of ringing noises. Most current techniques in this area, including the approach in the '384 patent have high computational complexity that makes them inefficient for many applications. Other techniques of this type can be found in U.S. Pat. No. 5,920,356, issued Jul. 6, 1999; and U.S. Pat. No. 5,819,035, issued Oct. 6, 1998. The '035 patent applies anisotropic diffusion on coded images to reduce ringing artifacts. Lowpass filtering is done by an iterative diffusion process. The '356 patent applies three-by-three lowpass filters in the spatial domain, and uses both temporal and edge characteristics of the video image to enhance the displayed image.

As mentioned above, these techniques have computation complexity and makes them inefficient for many applications. Also, most of the above techniques are directed specifically to DCT-based coding. Therefore, a more general purpose, efficient and simple technique for removing ringing artifacts from images reconstructed from any compression scheme would be useful.

SUMMARY

One aspect of the disclosure is a method for reducing visual artifacts in reconstructed images. The method determines edge energy for each pixel in the image and then compares the edge energy for each pixel to a threshold, producing an edge map. A distance transform is then used to produce a filter map and a filter is applied to pixel in the image, such that the filter applied is dependent upon a filter map value for each pixel. An output value for each pixel is then produced.

Another aspect of the disclosure is a facsimile machine that performs adaptive filtering on a decompressed image to remove visual artifacts.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
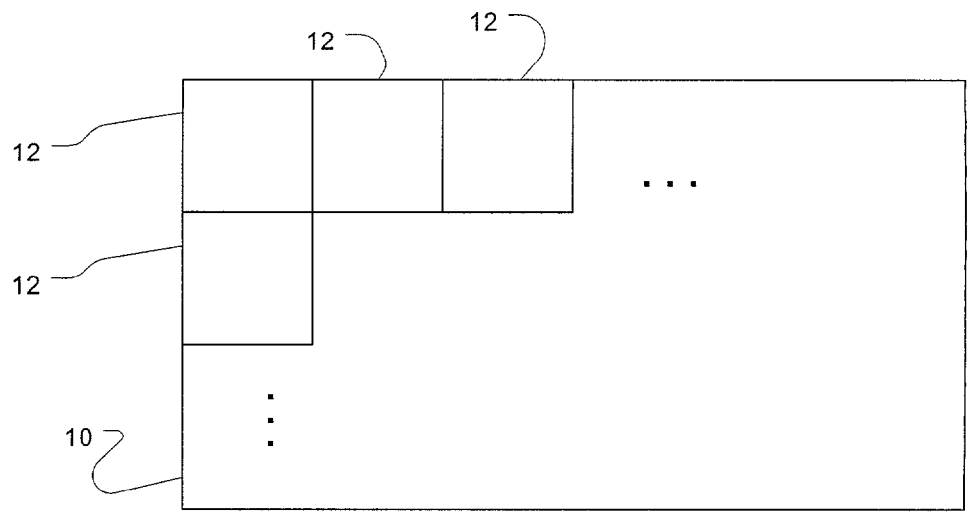
FIG. 1 shows an image broken up into image blocks for post processing, in accordance with the invention.

In one embodiment, the postprocessor processes images in a block-wise style, which means that the postprocessor processes one image block at each time. This approach requires very limited memory space in hardware implementation, independent from the size of the image being processed. An example is shown in FIG. 1, with an image 10 broken into image blocks such as 12. For instance, the image blocks 12 can be arranged horizontally across each strip of a large image.

$B_{m,n}(i,j)$, with $i=0, \ldots, (M-1)$, and $j=0, \ldots, (N-1)$, is used to represent an M-by-N image block, where the coordinate of pixel $(i,j)$ in the whole image is $$B_{m,n}(i,j)=(mu+i,nv+j)$$

The variables u and v represent the processing step size; while M and N are defined as (u+p) and (v+p), respectively; and p is a padding parameter. The padding parameter is necessary because of the convolution operations applied in the postprocessor; and its value relies on the specific convolution operations. In one embodiment, assume that u=v=32, in favor of future hardware development. In one embodiment, set p=4 when 3-by-3 convolution kernels are applied.

Figure 2:
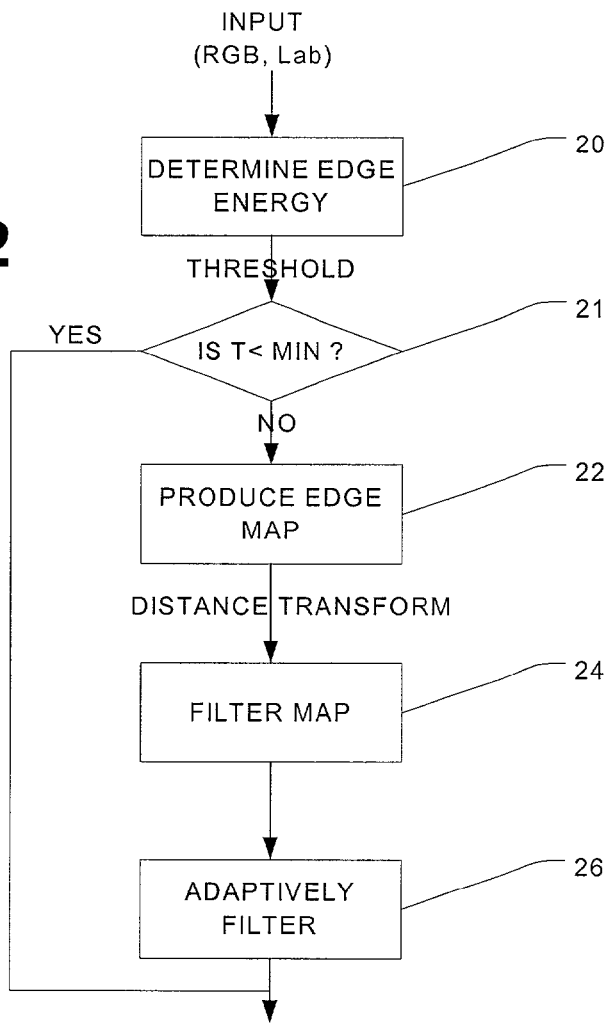
FIG. 2 shows a flowchart of one embodiment of a method for post processing reconstructed image signals, in accordance with the invention.

A method of adaptively filtering a reconstructed image is shown in FIG. 2. In one embodiment of a postprocessor, different color components, such as R, G, and B, or L, A, and B, as examples, of an image are processed independently. The post processing for each color component of each image block starts with edge detection at 20. Edge filters, such as Sobel filters, Prewitt filters, and DOG (Derivative of Gaussian) filters, can be used to generate the horizontal and vertical edge energies ($E_h$, $E_v$) for each image pixel. One embodiment used Sobel filters, such as those shown in FIG. 3.

The total edge energy for each pixel is then taken as $$E(i,j) = |E_h(i,j)| + |E_v(i,j)|$$

where $E_h$ is a summation of all of the pixel values of the surrounding pixels multiplied by the corresponding term in the horizontal filter with the current pixel p(i,j) located at the enter position of the filter. A similar calculation is performed for $E_v$ using the vertical filter.

An M-by-N edge map P is then derived at 22 from the edge energy by thresholding.

$$P(i, j) = \begin{cases} 1 & E(i, j) > T \\ 0 & \text{Otherwise} \end{cases} \quad (3)$$

The pixels with edge energy above the threshold T are labeled as edge pixels and set to 1 in the edge map.

Ringing artifacts usually occur on flat backgrounds near strong edges. The artifacts are stronger than the background but weaker than the edge. Therefore, if the local edge strength is known, it can be used to define a threshold below which a variation is insignificant. The threshold T can be defined as the following $$T = \min(T_0, E_{max}/2) \quad (4)$$

where $T_0$ is a user-defined maximum threshold, $E_{max}$ is the maximum edge energy within the current image block, which means that the threshold T can be different for different image blocks. Based on experiment, $T_0$ is set to 184 in this particular embodiment of a postprocessor.

To avoid introducing artifacts across the image block boundaries during post processing, the edge map boundary pixels are set as edge pixels, i.e., $$P(i,j)=1 \text{ if } i<2 \text{ or } i>(M-3) \text{ or } j<2 \text{ or } j>(N-3) \quad (5)$$

In one embodiment, when T is less than a small value, such as 2 or 4, the process skips the post processing steps completely. This is shown in FIG. 2, where the threshold, T, is compared to a predetermined minimum value MIN at 21. If T is less than MIN, the process ends. This approach effectively skips the post processing for a smooth block. It can significantly reduce the computational time when large areas of smooth background exist in an image.

From the M-by-N edge map P, a M-by-N filter map F(i,j) is generated at 24 using a distance transform, which is defined as the following.

$$F(i,j) = \min(D, \text{distance from pixel}(i,j) \text{ to the nearest edge pixel in the edge map}) \quad (6)$$

where D is the user-defined maximum distance. For instance, the edge pixels labeled in the edge map are given a value of 0 in the filter map. In one embodiment, the value of D is set to 3, in favor of most current microprocessors. In one embodiment, the distance between two pixels is defined as the maxim of the horizontal and the vertical coordinate differences of the two pixels.

Low-pass filters are then chosen adaptively for each image pixel according to the filter map F. For pixel (i,j), the size of the filter is (2F(i,j)+1)-by-(2F(i,j)+1). To reduce the computational burden, normalized structure elements are used as filters in one embodiment of a postprocessor. A normalized structure element means a normalized filter, where coefficients are all equal. Low-pass filters other than the normalized structure elements can also be applied during the adaptive filtering 26. To further reduce the computational complexity, the 2D filtering process can be performed in two steps using a horizontal and then a vertical 1D filters. In order to keep sharp image edges, for each image pixel, the filter element is set to 0 if corresponding neighboring pixel is shown as edge pixel in the edge map.

An alternative way for the two-step 1D filtering process is to use separate filter maps for horizontal and vertical operations, respectively. The filter maps are defined as the following.

$$F_h(i,j) = \min(D, \text{distance from pixel}(i,j) \text{ to the horizontally nearest edge pixel in the edge map})$$

$$F_v(i,j) = \min(D, \text{distance from pixel}(i,j) \text{ to the vertically nearest edge pixel in the edge map})$$

The filter size is (2$F_h$(i,j)+1) and (2$F_v$(i,j)+1) for horizontal and vertical filters, respectively. Since only 1D filter maps are derived and applied during post processing, this approach can further speed up the computation.

As mentioned, in order to keep sharp image edges, for each image pixel, the filter element is set to 0 if corresponding neighboring pixel is shown as edge pixel in the edge map. This means branch operations are heavily used, which increases the computational complexity. To avoid the branch operations and significantly reduce the computational time, the filter size can be changed to (2$F_h$(i,j)−1) and (2$F_v$(i,j)−1) for 1 D filters and (2F(i,j)−1)-by-(2F(i,j)−1) for 2D filters. The tradeoff is the degradation in the post-processing quality.

Figures 3, 4:
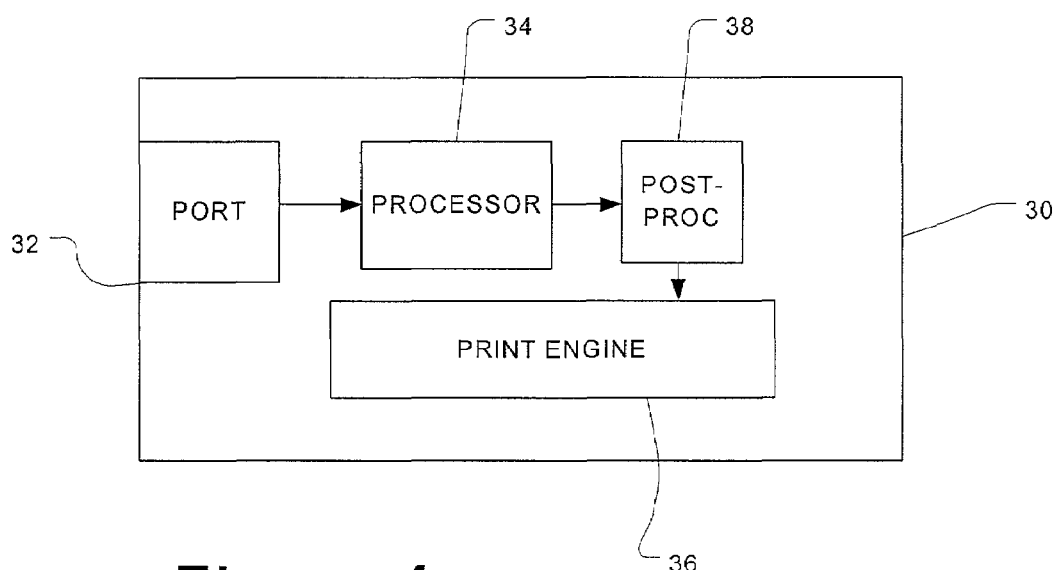
FIG. 3 shows horizontal and vertical Sobel filters.
FIG. 4 shows one embodiment of a system in which post processing is performed on reconstructed image signals, in accordance with the invention.

One of the potential applications of the adaptive image filtering technique is: post processing for images with texts and graphics. A more specific example is JPEG-based Color Fax. The postprocessor can be used in a color fax machine 30 to clean up the reconstructed image and deliver high-quality output, as shown in FIG. 4.

A port 32 is operable to receive a compressed image. The compressed image is then passed to a processor 34 that decompresses the image. Post-processor 38 then performs adaptive filtering as set out above, to remove the objectionable visual artifacts. This decompressed and filtered image is then passed to the print engine 36 for production as an output document. This output document may be a color document.

In some embodiments, the processor 34 and the post-processor 38 may be included in the same processor, but embodied by the processor executing different instructions when it acts as a processor and as a post-processor. Further, the methods of the invention may be performed by instructions contained on an article. The instructions, when executed, perform the methods of the invention.

The artifact reducing technique described here is applicable in many image (and video) processing systems, which employ block-based DCT coding schemes, such as JPEG, MPEG-1, MPEG-2, MPEG-4, H.261, and H.263. Since no DCT or any other coding information is considered in the postprocessor described here, the method can basically be used for image enhancement with any image coding schemes.

Values of parameters, such as the user-defined maximum distance D, maximum edge energy threshold $T_0$, image block width M and height N, provide flexibility for different applications.

Thus, although there has been described to this point a particular embodiment for adaptively filtering reconstructed image data, it is not intended that such specific references be considered as limitations upon the scope of this invention except in-so-far as set forth in the following claims.

What is claimed is:

1. A method for reducing visual artifacts in reconstructed images, the method comprising:
   determining edge energy for each pixel in the image;
   comparing the edge energy for each pixel to a threshold, producing an edge map, wherein the threshold is selected to be the minimum of a user-defined maximum threshold and half of the maximum edge energy within a current image block;
   using a distance transform to produce a filter map;
   applying a filter to each pixel in the image, wherein the filter applied is dependent upon a filter map value for each pixel; and
   producing an output value for each pixel in the image.

2. The method of claim 1, wherein the edge energy is determined using a Sobel filter.

3. The method of claim 1, wherein the edge energy is determined using a Prewitt filter.

4. The method of claim 1, wherein the edge energy is determined using a derivative of Gaussian filter.

5. The method of claim 1, wherein the edge energy is determined using a normal filter.

6. The method of claim 1, wherein pixels with an edge energy above the threshold are labeled as edge pixels and the corresponding value set to 1 in the edge map.

7. The method of claim 1 wherein the user-defined maximum threshold is 184.

8. The method of claim 1, wherein boundary pixels in the edge map are set as edge pixels.

9. The method of claim 1, wherein using a distance transform, applying a filter to each pixel in the image, and producing an output value for each pixel in the image of are not performed if the threshold is less than a predefined minimum value.

10. The method of claim 1, wherein the distance transform is the minimum value of a user-defined maximum distance and a distance of a current pixel to a nearest edge in the edge map.

11. The method of claim 10, wherein the user-defined maximum distance is 3 pixels.

12. The method of claim 1, wherein edge pixels in the edge map are given a filter map value of zero.

13. The method of claim 1, wherein the filter further comprises a two-dimensional low pass filter.

14. The method of claim 1, wherein the filter further comprises two one-dimensional low pass filters.

15. The method of claim 1, wherein the filter map further comprises separate filter maps, one for horizontal operators and one for vertical operators.

16. The method of claim 1, wherein the reconstructed image is in RGB color space.

17. The method of claim 1, wherein the reconstructed image is in LAB color space.

18. A facsimile machine, comprising:
   a receiver operable to receive an input image;
   a processor operable to decompress the input image, producing a decompressed image;
   a postprocessor operable to:
      determine edge energy for each pixel in the image;
      compare the edge energy for each pixel to a threshold, producing an edge map, wherein the threshold is selected to be the minimum of a user-defined maximum threshold and half of the maximum edge energy within a current image block;
      use a distance transform to produce a filter map;
      apply a filter to each pixel in the image, wherein the filter applied is dependent upon a filter map value for each pixel; and
      produce an output value for each pixel in the image; and
   print engine operable to print the decompressed and adaptively filtered image.

19. The method of claim 18, wherein the input image is a color image.

20. The method of claim 18, wherein the processor and the postprocessor are the same processor performing different sets of instructions.

21. An article of computer-readable media including instructions that, when executed, cause the computer to:
   determine edge energy for each pixel in the image;
   compare the edge energy for each pixel to a threshold, producing an edge map, wherein the threshold is selected to be the minimum of a user-defined maximum threshold and half of the maximum edge energy within a current image block;
   use a distance transform to produce a filter map;
   apply a filter to each pixel in the image, wherein the filter applied is dependent upon a filter map value for each pixel; and
   produce an output value for each pixel in the image.

* * * * *

UNITED STATES PATENT AND TRADEMARK OFFICE
CERTIFICATE OF CORRECTION

PATENT NO. : 7,006,255 B2
APPLICATION NO. : 09/823027
DATED : February 28, 2006
INVENTOR(S) : Shijun Sun et al.

It is certified that error appears in the above-identified patent and that said Letters Patent is hereby corrected as shown below:

Column 5, line 45, the words "image of" should read -- image --;
Column 6, line 31, the word "print" should read -- a print --.

Signed and Sealed this

Eighth Day of September, 2009

David J. Kappos
*Director of the United States Patent and Trademark Office*